United States Patent Office 3,269,810
Patented August 30, 1966

3,269,810
ANTIOXIDANTS FOR CRACKED PETROLEUM DISTILLATES, ESPECIALLY GASOLINE
Walter M. Chamot, Brookfield, Ill., assignor to Nalco Chemical Company, Chicago, Ill., a corporation of Delaware
No Drawing. Filed Sept. 19, 1963, Ser. No. 310,133
7 Claims. (Cl. 44—62)

This is a continuation-in-part of copending application Serial No. 726,650, filed April 7, 1958, now abandoned.

This invention, in general, relates to stabilizers or antioxidants for cracked petroleum distillates in the gasoline boiling range. More particularly, the invention relates to cracked gasolines containing as antioxidant mixtures substantially linear condensation polymers of phenols, lower aliphatic aldehydes and alkylene polyamines.

The catalytic cracking of petroleum hydrocarbons to form gasolines is a well established method of manufacture. Cracking is the process of converting large hydrocarbon molecules into smaller ones by the application of heat and/or catalysts. The gasoline products formed by cracking have an undesirable tendency to develop unstable products in the gasoline fractions. Under storage and use conditions these products form sludges or gums and also tend to discolor the gasolines. The presence of minute quantities of metals such as iron and copper accelerate the degradation process—acting as catalysts in the degradation of gasoline hydrocarbons. In order to retard the formation of sludges or gums by degradation of the gasolines, many additives have been proposed which function as stabilizers or antioxidants for the gasoline fractions. Other additives are employed as metal deactivators—serving the function of retarding the catalytic effect of metals in the degradation process. One of the requisites for additives for gasolines is that they must provide the stabilization, antioxidant properties or metal deactivating properties in very small concentrations in the gasoline so as not to interfere with the performance of the gasolines in internal combustion engines.

One of the objects of the present invention is to provide cracked gasolines containing minor amounts of gasoline-soluble, polymeric condensation polymers which retard the decomposition and oxidation of the cracked gasoline fuels.

A further object is to provide new and useful gasoline compositions which have excellent stability against the formation of degradation by-products under conditions of storage and use. Other objects will appear hereinafter.

In accordance with the invention, cracked gasolines are provided with minor amounts, generally falling within the range of 0.5–500 parts per million on a weight basis of a polymeric condensate formed by condensing a phenol, a lower aliphatic aldehyde, and an alkylene polyamine at predetermined molar ratios so as to obtain a substantially linear condensation polymer. The molar ratios of the phenols to alkylene polyamine is in the range of 1:0.5–1, respectively, and the molar amount of the aliphatic aldehyde is within the range of 0.9–1.1 times the total mols of the phenol and the alkylene polyamine. These molar ratios produce gasoline-soluble linear condensation polymers which are eminently suitable as stabilizers for gasolines, and it is preferred that the molar quantity of the aldehyde does not exceed the total mols of the phenols and the alkylene polyamines in order that the formation of cross-linked, gasoline-insoluble polymers be avoided. In the most preferred form of the invention, the molar ratio of the phenol to the aldehyde to the alkylene polyamine is about 1:2:1, respectively. The polymers produced in accordance with the invention are polymers ranging in molecular weight from about 500 to as high as 10,000 and varying from viscous liquids to solid compositions, all of which are oil-soluble.

There are several types of phenols which can be employed in the preparation of the polymers of the instant invention. The use of phenol itself as a reactant increases the probability of cross-linking to a considerable extent because of the three highly reactive positions in the phenol—the two ortho and the para positions. However, by employing certain precautions in the preparation of the polymer wherein phenol itself is a reactant, the cross-linking can be minimized. The first precaution is to avoid concentration of the phenol in the reaction mixture which increases the probability of cross-linking. To this end, it is recommended that the ratio of phenol to polyalkylene polyamine be approximately 1:1. Ratios of phenol to polyalkylene polyamine in the vicinity of 2:1 are to be avoided with respect to phenol itself. A second precaution is the limit of the amount of aldehyde added to the reaction mixture to a smaller maximum value than that set forth above. In this instance, the amount of aldehyde added in no case should exceed approximately a 3% excess over an amount of aldehyde equal to the total mols of phenol and the alkylene polyamine. Thus, the amount of the aldehyde in the reaction mixture should be in the range of 1.5–2.05 times the total mols of the phenol. It will be observed from the foregoing that the preferred molar ratios of phenol to aldehyde to alkylene polyamine is approximately 1:1.9–2.05:1.

In order to minimize cross-linking and produce a substantially linear polymer, it is preferred that the phenol reacted have at least two, not exceeding four, positions in the aryl ring occupied by a nonreactive substituent (that is, the phenol preferably has a functionality of from 2 to 4)—one of the positions being the hydroxyl group of the phenol and the other preferably being an ortho or para position to the phenolic hydroxyl group. This requisite is achieved by using phenols such as alkyl-substituted phenols, diphenols, alkyl-substituted diphenols, triphenols, monoalkyl-substituted triphenols, amino phenols, and hydroxyl benzaldehydes. It is preferred, but not absolutely essential, that two reactive, unsubstituted positions be ortho or para positions. Thus, specific phenols which may be used to produce the compositions of this invention include the monophenols-phenol, cresols, the xylenols, mesitol, thymol and higher alkyl substituted homologs such as ethyl phenol (phlorol), propyl phenol, diethyl pehnol, dipropyl phenol, octyl phenol, dioctyl phenol, nonyl phenol, dinonyl phenol and other alkyl phenols having alkyl groups up to 18 carbons in length; the diphenols (dihydroxy benzenes)—pyrocatechol (2-hydroxy phenol), resorcinol (3-hydroxy phenol), hydroquinone (4-hydroxyphenol), orcinol (dihydroxy toluene), and dihydroxyxylene; triphenols (trihydroxybenzenes)—pyrogallol and methyl pyrogallol; amino phenols such as monoamino phenol (p-aminophenol), diamino phenol and triamino phenol; salicylaldehyde; and hydroxy naphthalenes such as naphthol and alkyl substituted naphthols.

Mixtures of the foregoing compositions may also be used in preparing the compositions of this invention, and from an economic standpoint the mixtures are often to be preferred. Illustrative commercially available mixtures include cresylic acids (mixtures of the various homologs of cresols, often containing substantial quantities of xylenols) and commercial nonyl phenols which contain up to about 25% dinonyl phenol.

The alkylene polyamines that may be used include such materials as ethylene diamine, hexamethylene diamine, diethylene triamine, triethylene tetramine, tetraethylene pentamine, trimethylene diamine, propylene diamine, dipropylene triamine, and the like. The amines employed should contain a minimum of at least two amino groups having a reactive hydrogen on the amino nitrogens, i.e., primary or secondary amino groups. In addition to using the alkylene polyamines the substituted alkylene polyamines such as hydroxyethyl ethylene diamine, N-octadecyl-1,3-propylene diamine and similar type compounds may be used with equal facility. The preferred alkylene diamines are the polyalkylene polyamines—diethylene triamine giving a polymer which is outstanding as an antioxidant for cracked petroleum fuels.

The aldehydes are preferably lower aliphatic aldehydes having 1–2 carbons (formaldehyde and acetaldehyde). Formaldehyde may be used in its gaseous form or in other forms such as the solid paraformaldehyde or formaldehyde dissolved in an aqueous medium or in nonaqueous polar media such as isopropanol.

Formalin is an example of an aqeous formaldehyde solution of about 37% concentration. Special precautions usually are employed when the aldehyde reactant is an aqueous solution, such as formalin. For example, it is necessary to remove the water of the formalin solution during or after the condensation reaction—e.g., by application of vacuum to the reaction vessel or by dissolving the condensation product during the condensation reaction in a water immiscible solvent such as benzene, and then separating the water and solvent. The condensation takes place in the presence of water, but it is necessary to separate the water from the reactants during the condensation reaction if high degrees of condensation are to be achieved. The lower reaction temperatures may be employed, e.g., 50–80° C., when the phenol reactant has all three ortho and para positions unsubstituted and available for reaction. When only two of these positions are open and available for reaction, reaction temperatures in the range of 130–180° C. are recommended. In the second stage of the reaction, after all the formalin has been added and during which heating is continued for about ½–2 hours, a reaction temperature in the range of 130–150° C. is preferred.

General methods of preparation of the compositions employed in accordance with the invention are illustrated below:

(a) The alklene polyamine is mixed with the phenol, and the mixture is cooled to 0–10° C. The aqueous aldehyde solution is added dropwise while the reaction mixture is maintained at 0–10° C. over a period of ½ to 2 hours. The reaction mixture is stirred for an additional hour. During this interval the reaction temperature is allowed to rise to room temperature, and the mixture is usually heated at 50–60° C. for an additional hour. An aromatic solvent (benzene) is added to the mixture to dissolve the condensation product, and the water in the reaction mixture is separated from the organic solvent phase. The solution of the polymer may be used as such, or the solvent may be removed by vacuum distillation.

(b) The alkylene polyamine is mixed with the phenol, and the mixture is cooled to room temperature. The aldehyde is added in small portions to the reaction mixture. The temperature is maintained at 25–40° C. during the addition time of ½ to 2 hours. After all of the aldehyde has been added, the water is removed in the same manner as in (a).

(c) The alkylene polyamine is mixed with the phenol, and the aqueous aldehyde solution is added in small portions over a period of ½ to 2 hours. During this period the temperature is allowed to rise to 50–80° C. The reaction mixture is stirred at this temperature for an additional ½–2 hours. The water is then removed by decanting from the condensation product, and the traces of water in the condensation product are removed under vacuum at temperatures from 70° C. to 150° C.

(d) The alkylene polyamine is mixed with the phenol, and the aqueous aldehyde solution is added to the mixture in a short time interval. The reaction mixture is then heated at 60–80° C. for ½ to 6 hours. The reaction mixture is cooled and the water is removed either by decanting, by vacuum distillation or by separation after the product has been dissolved in an organic solvent.

(e) The polyalkylene polyamine is mixed with the phenol, and solid paraformaldehyde is added in portions over a period of ½ to 2 hours. The reaction temperature is maintained at 50–80° C. for a period of ½ to 2 hours after the paraformaldehyde had been added. The reaction mixture is cooled to room temperature and may be used as is.

(f) The polyalkylene polyamine is mixed with the phenol, and formaldehyde in isopropanol solution is slowly added over a period of ½ to 2 hours. The reaction mixture is stirred for ½ to 2 hours. The product may be used in this way or the solvent may be removed under vacuum. The temperature during the reaction may rise to 50–80° C.

(g) The reaction is performed as in (a), (b) or (c) above. The water is removed by vacuum distillation (10–20 mm.) at temperature not to exceed 100° C.

(h) The reaction is performed as in Procedures (a)–(f) above. The water is removed under vacuum and at temperatures of 100–160° C.

The degree of polymerization is important to the extent that an oil-soluble product is desired. However, polymers of higher molecular weight that are not soluble in oils (soluble under 50 p.p.m.) still impart desirable properties to the oil as in color stabilization, discussed infra. Solvents such as isopropanol may be added to maintain a homogeneous reaction mixture and to give better control of the degree of polymerization.

The following examples illustrate particular compositions of the present invention. The number of mols of reactants indicated is calculated on the basis of the active ingredient.

EXAMPLE I

In a plant preparation, 3,960 lbs. of octylphenol, 1,171 lbs. of ethylene diamine (98–100% pure), and 1,261 lbs. 91% paraformaldehyde are reacted according to the following procedure, 5,608 lbs. of aromatic hydrocarbon solvent being employed. Half of the aromatic solvent is charged into a stainless steel reactor and warmed to 160° F. The octylphenol is added in portions until it dissolves in the solvent (one hour). The ethylene diamine is then added and agitated for about one-half hour. The paraformaldehyde is slowly added. During the addition, water is passed through the cooling coils so that the temperature is maintained at 175–195° F. Total addition time is about 1.5 hours. When all of the paraformaldehyde is added, the heat is turned on and vacuum is slowly applied to the vessel. Care is exercised to prevent foaming over of product. Water distills off and is caught in a water trap while the temperature slowly rises to 270° F. (two hours). The reaction is kept at 270° F. under full vacuum for one-half hour. A sample is obtained and checked for water content. If water is absent, the remaining aromatic solvent is added and the sample is cooled to 100° F.

The product will vary in color from a light yellow to a dark red, but is usually a light reddish material.

EXAMPLE II

Phenol, diethylenetriamine, and formaldehyde in aqueous solution were reacted in the following molar amounts according to the following procedure.

| | Moles |
|---|---|
| Phenol | 0.68 |
| Diethylene triamine | 0.66 |
| Formaldehyde | 1.23 |

The phenol was placed in a 500-ml., 3-neck flask equipped with stirrer, condenser, and a dropping funnel. An ice-bath was prepared and placed under the flask. The amine was added through the dropping funnel to the flask at 5–10° C. temperature. The formaldehyde solution was then slowly added to the mixture while the temperature was maintained at 0–10° C. The reactants were stirred for one hour at this temperature and then warmed at 80° C. for two hours. A vacuum was then applied to the reaction vessel and water was stripped off. Yield—97% of theoretical.

EXAMPLE III

Mixed xylenols (Shell cresylic acid 2000AAA), 1,3-propylene diamine and formaldehyde as a 35% aqueous solution are reacted as follows in the following molar amounts:

|  | Mole |
|---|---|
| Mixed xylenols | 0.18 |
| 1,3-propylene diamine | 0.21 |
| Formaldehyde | 0.36 |

The amine was added to the phenol in a 500-ml., 3-neck flask equipped with a stirrer, a condenser, and a dropping funnel. The reaction mixture was kept at room temperature (25° C.) by occasional cooling with an ice-bath. The formaldehyde solution was added slowly over a period of about 0.5 hour while the temperature was maintained at 25±5° C. The reaction was stirred until no more heat was evolved. The mixture was then heated on a steam cone at 90–100° C. for 0.5 hour, and the water was removed by decanting. The product is a viscous red liquid.

EXAMPLE IV

About 0.18 mole mixed xylenols (Shell cresylic acid 2000AA), 0.40 mole Duomeen T (Armour & Company), and 0.35 mole of formaldehyde as a 35% aqueous solution were reacted according to the preparatory technique of Example III. Duomeen T is the reduction product of acrylonitrile and primary amines derived from tallow acids. It has a primary and a secondary amino group. Duomeen T is reported by its manufacturer to have the formula

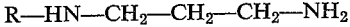

$$R-HN-CH_2-CH_2-CH_2-NH_2$$

wherein R is a long chain aliphatic hydrocarbon radical. The resulting product was a light red solid.

EXAMPLE V

About 0.39 mole of formaldehyde in isopropanol, 0.20 mole ethylene diamine as a 70% aqueous solution and 0.2 mole cresylic acid (Shell cresylic acid 2000AA) were reacted as follows:

The phenol was placed in a 3-neck flask equipped with a stirrer, condenser and a dropping funnel. A thermometer was inserted through the condenser for determining the temperature of the liquid. The amine was added in several portions to the phenol while cooling with an ice-bath to keep the temperature from rising above 35° C. Formalin was added slowly while the temperature was maintained at 20–35° C. When all of the formaldehyde solution had been added, the reaction mixture was heated to refluxing (90–100° C.) for 0.5 hour. No attempt was made to remove the alcohol or the water from the reaction mixture. The resulting product is a light straw-colored liquid.

EXAMPLE VI

Following the procedure of Example V, 0.59 mole formaldehyde in isopropanol, 0.30 mole diethylene triamine and 0.30 mole cresylic acid (Shell 2000AA) are reacted. The resulting product is a red liquid.

EXAMPLE VII

Following the procedure of Example V, 0.40 mole formaldehyde in isopropanol, 0.24 mole triethylene tetramine and 0.20 mole cresylic acid (Shell 2000AA) are reacted. The product is a dark red liquid.

EXAMPLE VIII

Following the preparatory technique of Example V, 0.40 mole of formaldehyde in isopropanol, 0.20 mole tetraethylene pentamine and 0.20 mole cresylic acid (Shell 2000AA) are reacted. The product is a straw-colored liquid.

EXAMPLE IX

Following the procedure of Example V, there is reacted 0.40 mole formaldehyde in isopropanol, 0.20 mole cresylic acid (Shell 2000AA), and 0.20 mole equivalent of polyimine, as a 50% solution in mineral oil. The product was a white solid having limited solubility in hydrocarbon solvents and was probably cross-linked to some extent.

EXAMPLE X

Following the preparatory technique of Example V, 0.20 mole formaldehyde in isopropanol, 0.1 mole Duomeen C (Armour & Company), and 0.10 mole cresylic acid (Shell 2000AA) are reacted. The product separated into two phases. The bottom layer (isopropanol and water) was separated from the product in a separator funnel and discarded. The remaining product was a brown liquid.

EXAMPLE XI

Following the preparatory technique of Example V, 0.20 mole tetraethylene pentamine, 0.20 mole cresylic acid (Shell 2000AA) and 0.40 mole of formaldehyde in isopropanol are reacted.

EXAMPLE XII

About 0.22 mole of p-aminophenol dissolved in 0.8 mole isopropanol, 0.20 mole ethylene diamine in a 70% aqueous solution, and 0.37 mole of formaldehyde, a 35% aqueous solution, are reacted as follows:

In a 3-neck flask equipped with stirrer and condenser the phenol was dissolved in the isopropanol. The ethylene diamine was added without cooling. The flask was then equipped with a dropping funnel and the aqueous formaldehyde was added. Since the reaction did not proceed at the usually rapid and highly exothermic rate, the mixture was heated at reflux (90°–100° C.) for forty-eight hours. At the end of this time, a water trap was added to the apparatus and the water-alcohol mixture was removed under reduced pressure. The product is a very dark solid.

EXAMPLE XIII

About 1.50 moles of a mixture of meta-cresol and para-cresol, 1.50 moles of ethylene diamine as a 70% aqueous solution, and 2.83 moles of formaldehyde as a 35% aqueous solution are reacted as follows:

In a round-bottom vessel the ethylene diamine was added to the cresol in several portions and with occasional cooling in an ice-bath to keep the temperature from rising above 125° F. (51° C.). The vessel was then cooled to room temperature, and the formalin was added slowly and in portions while the temperature rose to 160° F. When all of the formaldehyde had been added, a water trap and a condenser were placed on the flask. A partial vacuum of 100 mm. was applied, and the water was removed by heating the reaction products to 150° C. in an oil bath. A dark red resinous material readily soluble in benzene and other organic solvents was obtained.

EXAMPLE XIV

The reaction of Example XIII was repeated with the exception that the water was removed at 105° C. instead of 150° C. The resulting product is a light yellow, viscous liquid.

EXAMPLE XV

About 0.50 mole of p-cresol, 0.50 mole of ethylene diamine as a 70 aqueous solution and 1.00 mole formaldehyde as a 35% aqueous solution are reacted as follows:

The para-cresol was mixed with ethylene diamine in an open Erlenmeyer flask immersed in ice water. The temperature was kept below 0° C. during the addition of the ethylene diamine. The aqueous formaldehyde was added slowly over a period of about one-half hour so that the temperature did not rise above 30° C. After the addition of formalin, the reaction was stirred for ten minutes and then warmed on a steam bath (at 90–100° C.) for one hour. The lower layer was separated from the upper layer and heated on a steam cone to remove traces of water and volatile materials.

EXAMPLE XVI

About 0.25 mole of meta-cresol, 0.25 mole of p-phenylene diamine, and 0.50 mole of formaldehyde as a 35% aqueous solution are reacted as follows:

The meta-cresol and the phenylene-diamine were dissolved in alcohol. To this mixture the formaldehyde was added while the temperature was maintained at 20° C. or less with cooling. Upon completing the addition of formaldehyde, crystals began to form. The mixture was warmed for ten minutes and filtered. The crystals decomposed at 135° C.

EXAMPLE XVII

About 1.0 mole phenol, 1.0 mole diethylene triamine, and 2.0 moles formaldehyde as a 35% aqueous solution were reacted as follows:

A 3-neck flask equipped with stirrer, thermometer, and dropping funnel was used as the reaction vessel. The phenol and 300 g. crushed ice were placed in the flask. Diethylene triamine was added. The heat evolved during the addition of amine melted the ice. The formalin was added over a period of one hour. The reaction was maintained at 5–10° C. with an ice bath. The reaction mixture was allowed to warm to room temperature. The excess water was removed by decanting and the product was dissolved in benzene. The remaining water was removed by azeotropic distillation with the benzene. The product is a dark red viscous liquid.

EXAMPLE XVIII

About 1.0 mole ethylene diamine as a 70% aqueous solution, 0.9 mole of p-cresol, and 2.0 moles of formaldehyde as a 35% aqueous solution are reacted as follows:

The phenol was dissolved in isopropyl alcohol and placed in a 3-neck flask equipped with stirrer and condenser. The amine was added to the phenol in portions while the flask was kept cooled to room temperature with an ice-water bath. The formaldehyde solution was slowly added while the temperature was kept at 25° C. After all of the formaldehyde had been added, the mixture was stirred for an additional 0.5 hour and then heated at refluxing temperature for one hour. Benzene was added, and the water, alcohol, and benzene were removed by azeotropic distillation.

The products produced in each of the above examples are readily soluble in such solvents as benzene, isopropanol and methyl alcohol and are soluble in gasoline and similarly related liquid hydrocarbons in the concentrations employed in antioxidant or stabilization treatment thereof.

To demonstrate the use of these polymers as antioxidants for cracked gasoline distillates, the oxidation stability of a cracked gasoline was determined by the induction test which involves the initial establishment of a 100 lbs. oxygen atmosphere in a closed bomb over a body of gasoline to be tested. The temperature is maintained at 100° C., and the test is terminated when the pressure drop in the test vessel is more than two lbs. in a 15-minute period. The total time of the test period is observed—the longer the induction period, the better is the stability of the gasoline being tested.

The amounts of both additives tested were 10 parts per million on a weight basis. A commercial antioxidant, 2,6-ditertiarybutyl-4-methylphenol, was used for purposes of comparison.

*Table I*

| Test No. | Treatment | Induction Period, hours |
| --- | --- | --- |
| 1 | Blank | 11½ |
| 2 | 2,6-ditertiarybutyl-4-methylphenol | 14½ |
| 3 | Composition of Example I | 35 |

From the above it becomes obvious that the compositions of the invention are superior to the commercial antioxidant and are effective at extremely low dosages. When treating cracked petroleum distillate fuels good results are obtained when the products are used at a dosage of as little as 0.5 part per million on a weight basis with good results being obtained at 10 to 50 parts per million. In some cases it may be necessary to use up to 500 parts per million, but generally this is an extreme case.

It has been observed that the compositions of this invention also have metal deactivating properties. Metals such as iron and copper act as catalysts in the degradation of gasolines, and minute amounts of the metals accelerate the degradation rate manyfold. The compositions of this invention retard the undesirable catalytic effect of metals—a property usually referred to as metal deactivating.

The word "gasoline" where it appears in the foregoing description of the invention and the appended claims means a liquid hydrocarbon distillate fraction which is manufactured and marketed as a fuel for ignition type combustion engines and constitutes liquid hydrocarbons ranging from 5 carbons to those having boiling points not in excess of 400° F. This range is one which is generally accepted in the industry although it is recognized that some manufacturers define their gasoline range in slightly narrower or slightly broader ranges.

The invention is hereby claimed as follows:

1. Cracked gasoline subject to oxidation containing small, antioxidant amounts of substantially linear condensation polymers formed by the condensation reaction of phenol, alkylene polyamines having reactive hydrogens on at least two amino nitrogens, and lower aliphatic aldehydes selected from the group consisting of formaldehyde and acetaldehyde, the mol ratio of phenol to said alkylene polyamines being in the range of 1:0.5–1, respectively, the mols of said aldehyde being 0.9–1.1 times the total mols of phenol and said alkylene polyamines, and the amount of aldehyde in mols being from 1.5–2.05 times the mols of phenol.

2. Cracked gasolines containing 0.5–500 parts per million by weight of substantially linear condensation polymers formed by the condensation reaction of an alkyl substituted phenol, said alkyl group containing from 1 to 18 carbon atoms, a lower aliphatic aldehyde having 1–2 carbons, and an alkylene polyamine having reactive hydrogen atoms on at least two amino nitrogens, the mol ratio of said phenol to said alkylene polyamine being in the range of 1:0.5–1, respectively, the mols of said aldehyde being 0.9–1.1 times the total mols of said phenol and said alkylene polyamine, and the amount of aldehyde in mols being from 1.5–2.05 times the mols of said phenol.

3. The composition of claim 2 wherein the alkylene polyamine is an alkylene polyamine having 2–5 amino groups.

4. Cracked gasolines containing 0.5–500 parts per million by weight of gasoline-soluble substantially linear condensation polymers formed by the condensation reaction of an alkyl substituted phenol, said alkyl group containing from 1 to 18 carbon atoms, formaldehyde, and an alkylene polyamine having reactive hydrogens on at least 2 amino nitrogens at molar ratios of approximately 1:2:1, respectively.

5. The composition of claim 4 wherein the alkylene polyamine is an N-unsubstituted alkylene polyamine having 2–5 amino nitrogens.

6. The composition of claim 4 wherein the alkyl substituted phenol is mono-octyl phenol.

7. The composition of claim 2 wherein the alkyl substituted phenol is mono-octyl phenol.

References Cited by the Examiner

UNITED STATES PATENTS

| | | | |
|---|---|---|---|
| 2,336,006 | 12/1943 | Fuller | 252—403 |
| 2,353,192 | 7/1944 | Sargent et al. | 44—73 |
| 2,453,850 | 11/1948 | Mikeska et al. | 44—75 |
| 2,459,112 | 1/1949 | Oberright | 252—51.5 |
| 2,504,742 | 4/1950 | Smith et al. | 252—51.5 |
| 2,984,550 | 5/1961 | Chamot | 44—73 |

DANIEL E. WYMAN, *Primary Examiner.*

J. E. DEMPSEY, *Assistant Examiner.*